Nov. 6, 1934.  G. GRINDROD  1,979,685
APPARATUS FOR HEAT TREATING FOODS
Original Filed Feb. 2, 1928    2 Sheets-Sheet 1
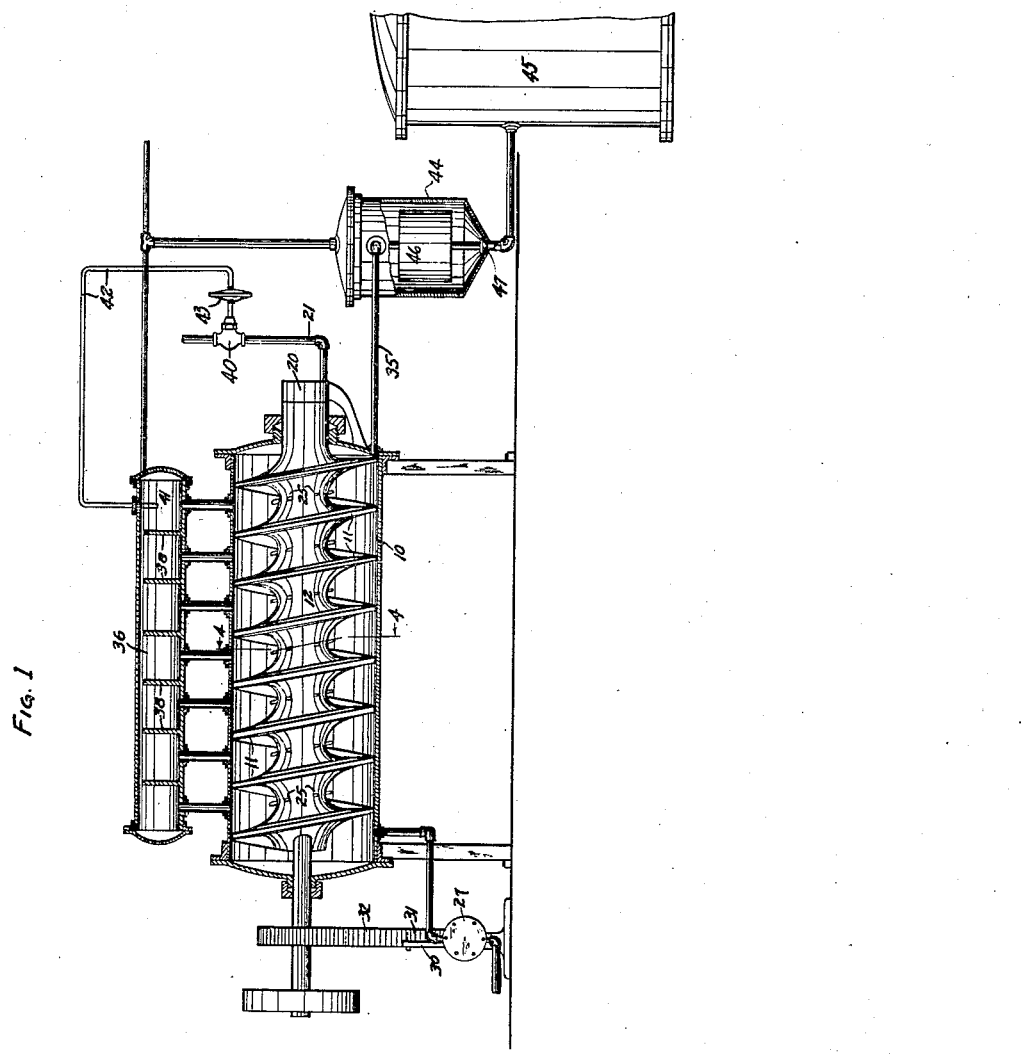
INVENTOR.
George Grindrod
BY
Erwin, Wheeler & Woolard
ATTORNEYS Nov. 6, 1934.    G. GRINDROD    1,979,685
APPARATUS FOR HEAT TREATING FOODS
Original Filed Feb. 2, 1928    2 Sheets-Sheet 2
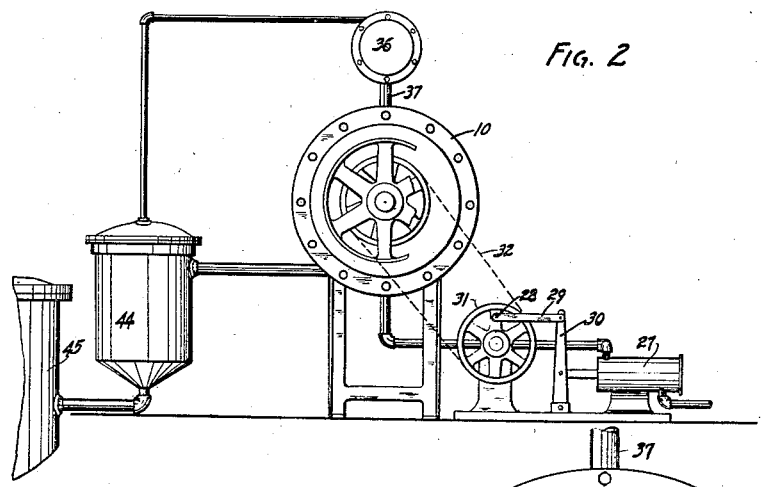
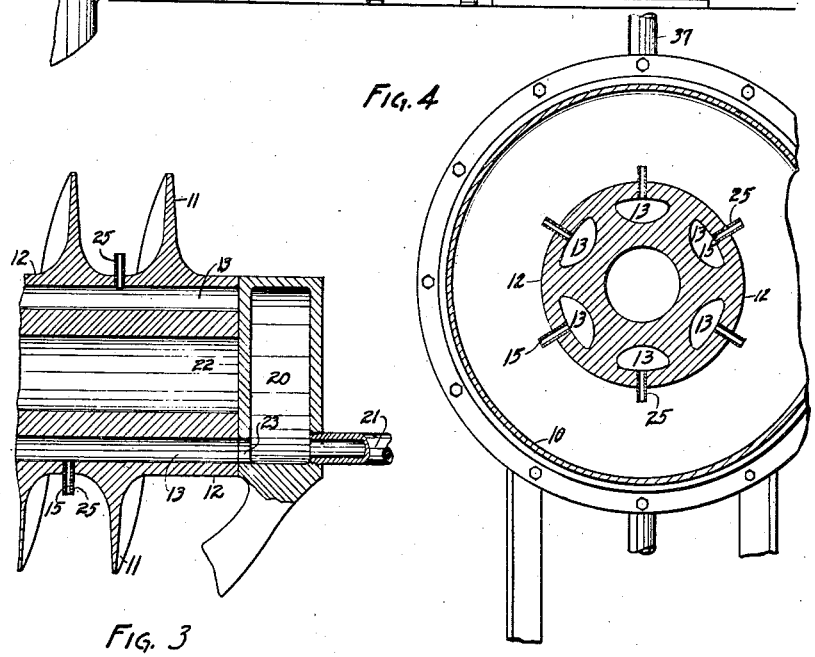
INVENTOR.
George Grindrod
BY
Erwin, Wheeler & Woolard
ATTORNEYS Patented Nov. 6, 1934

1,979,685

UNITED STATES PATENT OFFICE 1,979,685

APPARATUS FOR HEAT TREATING FOODS

George Grindrod, Oconomowoc, Wis., assignor to Grindrod Process Corporation, Waukesha, Wis., a corporation of Wisconsin Original application February 2, 1928, Serial No. 251,304. Divided and this application March 21, 1929, Serial No. 348,832. Renewed March 23, 1933

22 Claims. (Cl. 261—87)

My invention relates to apparatus for heat treating foods, this application being a division of my former application Ser. No. 251,304, filed February 2, 1928.

An object is to provide means for completely sterilizing foods, particularly liquid and semi-liquid foods such as milk and cream, without affecting the flavor.

More particularly stated, my object is to provide means to facilitate thermal sterilization in which the process can be carried on continuously and rapidly with a large total output for a given period of time as compared with sterilizing processes as heretofore practiced; to provide suitable apparatus, in which a continuously flowing stream of material may be sub-divided and each sub-division heat treated in the same manner and to exactly the same extent as every other sub-division, whereby precise results can be obtained; to provide apparatus which may be interchangeably used for either pre-warming or sterilizing purposes; to provide for successively subjecting segregated portions of a moving stream of food to permeating jets of steam moving sweepingly through the segregated portions of the food in a manner to reach all portions thereof with like effect and to repeat the operation indefinitely as to any desired number of such segregated portions; to provide means whereby the product so treated may be delivered into containers, the heat treatment being instantly arrested and the temperature of the food simultaneously reduced to a point where change in the characteristics or flavor of the food will not occur; to provide for completing the treatment as to any given portion of the food with such expedition that changes in the character or flavor of the food will not occur during the heat treatment; and to provide simple and reliable means to facilitate carrying on the process and insure accurate and uniform results.

In the drawings:—

Figure 1 is an elevational sectional view of a preferred form of apparatus which I have designed for the purposes of my invention and embodying its mechanical features.

Figure 2 is an end elevation.

Figure 3 is a detail view, enlarged, showing a fragment of the rotary feeder and distributor in its relation to the steam chest from which the distributing steam passages are fed.

Figure 4 is a cross section drawn to line 4—4 of Figure 1.

Like parts are identified by the same reference characters through the several views.

In a former Patent No. 1,714,597, dated May 28, 1929, I have disclosed a method of sterilizing milk by what may be termed the kettle or batch method. By that method, the milk is sterilized by injecting into it from beneath, quantities of steam in a manner to heat the milk to a temperature of about two hundred and thirty degrees F., maintain that temperature from two to three minutes, and then reduce the temperature almost instantly to prevent thermochemical change; but the method and apparatus disclosed in said Patent No. 1,714,597, is subject to certain economic disadvantages incident to batch processes in general when large quantities of material require to be expeditiously treated and in cases where the source of supply is substantially continuous. Under such circumstances, the batch process involves loss of time, loss of heat and other disadvantages incident to intermittent operation, whereas under other conditions the batch process may be preferred.

The apparatus herein disclosed is designed to provide for a continuous process for sterilization of liquiform materials, substantially uniform in heat and time as to all portions of the material and yet of such short duration as to avoid thermo-chemical change in the food as effectually as is done under the process described in said patent. In my former process, the heat applied is much less than that required to produce thermal sterilization by ordinary methods previously employed.

In the use of the apparatus herein described I pass a continuously flowing stream of material through a treating zone in which the material is subdivided into small portions and segregated or sufficiently isolated from other portions in the treating zone to prevent contamination of the more advanced material from the portions of material in the earlier stages of treatment, each portion in an advanced stage being also isolated and protected from unsterile material entering the zone by the interposition of materials undergoing treatment in the less advanced stages. My invention also contemplates maintenance of balanced pressures upon the various portions in said zone whereby there will be no tendency to force material from one subdivision into another.

During the passage of the material through said treating zone, I separately subject each subdivided portion to the action of jets of steam which are delivered into the material below the surface thereof, preferably at constantly changing angles and from constantly changing points of delivery. These jets may be made to sweep through the material from one side of the general line of travel to the other side and by injecting the steam at a high pressure at the point of emergence from a traveling nozzle, the jets are caused to move with a sweeping action across the particles of material which they contact, and underneath the surface of the segregated portion. When the material is to be sterilized, the steam may thus enter the material at a predetermined high pressure and a correspondingly high sterilizing temperature, and by employing a series of steam injecting nozzles along the line of travel each subdivided portion may be subjected successively to such jets of steam in successive stages of its advancement whereby each such portion may be continuously followed by other portions in different stages of advancement with a resultant continuous delivery of the product.

In this manner each of the small subdivided portions may be made equal in quantity to all other subdivided portions and equally subjected to the action of equal quantities of steam having the same pressure and temperature and sweeping in the same manner through each portion of the material whereby the particles of material will have substantially uniform exposure to the particles of steam in each of the subdivisions.

In the improved apparatus milk, or other material to be treated, will be fed from a source of supply into a cylinder or cylindrically curved trough 10, which is disposed horizontally, or nearly so, and which contains a screw conveyor 11 having a helical blade, the outer margin of which substantially fits the concave interior surface of the cylinder or trough below a horizontal plane through the conveyor axis, and may substantially fit the cylinder wall throughout its area as shown in the drawings. This conveyor 11 has a large shaft 12, which is provided with an annular series of longitudinally extending steam passages 13, (Fig. 4). Each steam passage 13 has ports 15 leading respectively through the wall of the shaft to the spaces between successive turns of the helical blade of the conveyor so that when the cylinder 10 is filled approximately half full of milk or other material to be treated, steam may be injected into each portion of milk between successive turns of the blade. When the cylinder is filled to a level at which its surface is intersected by the drum of shaft 12, each such portion of the material will be effectually partitioned from the other portions and it may therefore be separately and independently subjected to the action of the associated steam jet or jets.

In this way the atmosphere above the segregated portions of material is also subdivided into segregated portions in the same way that the liquid is divided. Thus communication is prevented between any portions of the liquid separated by two or more turns of the helix of the shaft such as might otherwise occur through the medium of the atmosphere above the liquid. With successive portions of the advancing stream thus segregated it will be obvious that the portions nearest to the outlet will be separated from the infeeding material, not only by the mechanical means provided by the conveyor flight but by the following segregated portions of material undergoing earlier stages of steam treatment. Therefore while in each successive space the jets of steam will agitate the material, the desired degree of isolation can nevertheless be maintained in such a manner as to insure delivery of a sterile product where sterility is desired and uniformity in the quality of the product even in cases where the process is not being employed for sterilizing purposes.

While I have shown and described the trough 10 as a cylinder for the reason that in the specific or preferred embodiment of my invention as illustrated in the drawings, I employ a cylinder, yet it is essentially a trough, the material to be treated being below the level of the top of the drum-like shaft 12 and the upper portion or wall of the chamber 10 serving as a cover. The cylindrical form is preferred for the reason that, with the liquid at the level of the shaft the steam and entrained material above each segregated portion is also separated from that above the other portions.

If the material were allowed to fill the cylinder or even to fill it to a level above the drum 12, there would remain no partitioning means. The portions between successive turns of the helical flange or blade 11 would then be permitted to fall below the drum, the material would not properly receive the steam jets below its surface and with the submerged sweeping action that makes the treatment effective to accomplish complete sterilization within a very short interval of time and before the material undergoes any substantial chemical or flavor change.

Steam is delivered to the passages 13 from a steam chest 20 which receives it from a supply pipe 21. The end 22 of the shaft 12 is machined and fitted to the wall of the chest 20 on the inner side and the passages 13 are successively brought into registry with a port 23 in said wall to receive steam from the chest while being carried past this port by the rotation of the conveyor. The port 23 is located below the shaft axis, and preferably registers only with the lowermost passage. But its size and the form of the passage opening are such that steam will be supplied to the passage throughout the major portion of the period during which the associated ports are moving through the material as the conveyor rotates. But steam will be delivered only into passages which are in a position to deliver steam directly into the material through their ports 15. The ports or outlets are, of course, submerged in the material before the steam jets are projected therefrom and, therefore, the steam does not merely blow against the surface of the material and form cavities therein, but on the contrary, travels at high velocity through portions of the material underneath its surface with resultant violent agitation (as described in my Patent No. 1,714,597). Preferably, each port 15 is provided with a projecting nozzle 25 to deliver the steam more effectively and to a greater depth into the material than would be the case if mere ports or apertures were used. If this is done, sterilization may, of course, be accelerated by the impactive and searing effects of the steam.

A positive feed mechanically driven pump 27 is employed to deliver the material into the cylinder 10. This pump is actuated from the crank 28 through the link rod 29 and the lever 30. The crank wheel carries a sprocket pulley 31 which drives the conveyor through a chain 32. The pump and its actuating mechanism are so constructed as to size and speed of operation that the material will be delivered to the cylinder 10 at a rate calculated to maintain the supply in the cylinder at a level above the bottom of the shaft 12 and below the top thereof, whereby each successive portion or unit of material will be separately conveyed by the screw, given separate heat or steam treatment and discharged through an outlet duct 35 without intermingling with other portions while in the cylinder. In this manner I divide the liquid or material being treated in the trough into segregated portions. As the screw conveyor rotates, each portion moves toward the discharge end and receives sweeping jets of steam from the nozzles as they successively come into action. The transversely swinging movements of the nozzles are across the path along which the material travels and all particles of the material are therefore very effectively reached. The nozzles follow the helical line of the screw in their arrangement and therefore each successive nozzle operating upon any given portion of the liquid enters it a little farther toward the outlet than its predecessors, although in the same relative position with reference to the center of the body of material, the latter having correspondingly moved toward the outlet.

The action of the steam upon the material causes a violent ebullition of the latter, and in order that the steam may continuously escape, I employ an expansion chamber 36, preferably superposed on or above the cylinder 10 and connected at intervals by the vertical pipes 37. Baffles 38 are placed in the expansion chamber, which also serves as a separator for any milk (material) that may be carried from the splashing liquid into this chamber 36. The separated material falls back usually into the next unit. The steam supply to the cylinder 10 is regulated by a valve 40 which is controlled automatically by a heat regulating or pressure bulb 41 in the expansion chamber, this bulb being connected by a pipe 42 with a diaphragm chamber 43, the diaphragm of which is connected with the valve stem in a well known manner.

The rate of steam feed and the size and number of the nozzles 25 will be so proportioned to the quantity of material handled and so calculated with reference to the temperature of the steam that each portion of material treated will be sterilized in the shortest possible interval of time, consistent with thorough sterilization, and the material will then be instantly cooled by discharging it into a container 44 which may be connected with a suitable condenser 45. The container 44 may have its outlet controlled by a float 46 and float controlled valve 47 so that the material may be delivered into a receiver under vacuum without allowing steam to blow through the outlet.

When the apparatus is used for pre-warming milk or other material, its operation will be the same except that steam of a lower temperature may be used, or the material fed through the apparatus at a more rapid rate. But with steam at 100 pounds pressure and corresponding temperature, only a few seconds will be required to effect a complete sterilization. With steam at the pressure and temperature above mentioned, thirty seconds should be ample, although the time interval required will also vary in proportion to the volume of material in each segregated portion or unit and the quantity of steam delivered thereto.

In the use of the apparatus herein described, the material may be substantially instantaneously raised to the desired temperature, maintained at said temperature momentarily and then all thermo-chemical change is arrested by the chilling that results by release of pressure and the resulting vaporization. When sterilizing the material, the temperature should be such as to accomplish that purpose in the desired degree with such momentary exposure, although the time interval may be varied by varying the speed at which the conveyor screw is rotated or by varying the temperature of the steam.

I claim:

1. Apparatus of the described class comprising the combination of a horizontally disposed cylinder, a conveyor therein having a helical flight, the outer margin of which substantially conforms to and fits the portion of the cylinder below the axis of the conveyor, said conveyor having a supporting shaft provided with multiple longitudinally extending passages, the walls of which are ported to allow steam delivery, means for connecting the passages successively with a source of steam supply when in a position to deliver steam into the lower half portion of the cylinder, and means for operating the conveyor to feed material through the cylinder in subdivided portions separated from each other by successive portions of the conveyor flight and the conveyor shaft.

2. Apparatus of the class described, comprising the combination of a chamber through which such materials may be passed, traveling partition means for subdividing such material into measured portions during their passage through such chamber while allowing the material to travel therethrough substantially as a continuously flowing stream, and means for independently heat treating each such subdivided portion during its passage through the chamber, together with means for regulating delivery of the material into said chamber to maintain a predetermined depth of material in each subdivided portion, and means for regulating the rate of flow of such material through the chamber by mechanically moving the partitioning members at a predetermined speed.

3. Apparatus of the class described, comprising the combination of a conveyor trough having inlet and outlet ports and a concave bottom, a rotary conveyor therein having a drum-like shaft encircled by a helical conveyor blade, the outer margin of which conforms in curvature to and substantially fits the inner surface of the lower portion of said trough, a superposed expansion chamber having communicating drainage connection with the trough, means for feeding material into the trough in quantities sufficient to maintain its upper surface in a plane intersecting said drum-like shaft, and means for separately injecting steam into the subdivided bodies of material to heat the same to the desired temperature.

4. Apparatus of the class described, comprising the combination of a conveyor trough having inlet and outlet ports and a concave bottom, a rotary conveyor therein having a drum-like shaft encircled by a helical conveyor blade, the outer margin of which conforms in curvature to and substantially fits the inner surface of the lower portion of said trough, a superposed expansion chamber having communicating drainage connection with the trough, and means for feeding material into the trough in quantities sufficient to maintain its upper surface in a plane intersecting said drum-like shaft, said drum-like shaft being provided with nozzles having steam supply connections adapted to deliver steam jets intermittently at intervals corresponding substantially with those of nozzle penetration of the material and while the nozzles are rotating with the shaft transversely to the line of travel of the material.

5. Apparatus of the class described, comprising the combination of a conveyor trough having an inlet at one end and an outlet at the other, a screw conveyor in said trough, and interconnected means for operating said screw conveyor and delivering material through the inlet of said trough at a rate proportionate to the speed of conveyor rotation and in a manner to maintain a depth of material in the trough substantially at the axis of the conveyor, said apparatus being provided with passages adapted to deliver steam into portions of the material while separated from each other by the conveyor flight, whereby said portions may be separately and independently heated while actuated by the conveyor.

6. Apparatus of the class described, comprising the combination of a conveyor cylinder having an inlet at one end and an outlet at the other, a screw conveyor operatively fitted to said cylinder, and interconnected means for operating said screw conveyor and delivering material through the inlet of said cylinder at a rate proportionate to the speed of conveyor rotation and in a manner to maintain its level substantially at the axis of the conveyor, said apparatus being provided with passages adapted to deliver steam into portions of the material separated from each other by the conveyor flight, whereby said portions may be separately and independently heated while actuated by the conveyor, said conveyor cylinder having a superposed expansion chamber provided with multiple connections with the interior of the conveyor cylinder to separately receive steam from the subdivided portions of the material.

7. Apparatus of the class described, comprising the combination of a conveyor trough having an inlet at one end and an outlet at the other, a screw conveyor in said trough, and interconnected means for operating said screw conveyor and delivering material through the inlet of said trough at a rate proportionate to the speed of conveyor rotation and in a manner to maintain its level substantially at the axis of the conveyor, said conveyor being provided with passages adapted to deliver steam into portions of the material separated from each other by the conveyor flight, whereby said portions may be separately and independently heated while actuated by the conveyor, said conveyor trough having a superposed expansion chamber having multiple connections with the interior of the conveyor trough to separately receive steam from the subdivided portions of the material, and said expansion chamber being provided with means for regulating the volume of steam delivered to the conveyor trough in accordance with predetermined pressure and temperature conditions therein desired to be maintained.

8. Apparatus of the class described comprising the combination of a conveyor trough having an inlet at one end and an outlet at the other, a screw conveyor in said trough, interconnected means for operating said screw conveyor and delivering material through the inlet of said trough at a rate proportionate to the speed of conveyor rotation and in a manner to maintain its level substantially at the axis of the conveyor, said conveyor being provided with passages adapted to deliver steam into portions of the material separated from each other by the conveyor flight, whereby said portions may be separately and independently heated while actuated by the conveyor, a receiver connected with the outlet of said trough and ported in its upper and lower portions, a float operated valve controlling delivery through the lower port, and a condenser connected with the upper port.

9. In an apparatus for heat treating materials capable of being handled in the manner of liquids, the combination of a conveyor having a shaft provided with longitudinal passages therein arranged in a circular series about the axis of the shaft, a steam chest at one end of the shaft having a port in position for successive registry with said passages as the shaft is rotated, and nozzles adapted to deliver steam from each passage at intervals along the length of the shaft.

10. In apparatus for heat treating materials the combination of a cylindrically curved trough provided with inlet and outlet ports at its respective ends, a conveyor in the trough, means for feeding material into the trough through the inlet port, means for actuating the conveyor and regulating the feeding means in a manner to maintain a predetermined depth of material in the trough while allowing the conveyor flight and shaft to subdivide such material into portions separated from each other, and means associated with the conveyor for delivering steam jets into such separated portions of material while the jet delivering means are being carried through the material by the rotation of the conveyor; said jet delivering means being otherwise inoperative for steam delivery.

11. Apparatus for heat treating a moving stream of material, comprising the combination of traveling partitioning devices for temporarily subdividing portions of the stream and the spaces above them to prevent commingling with, and contamination from, other portions, traveling steam nozzles adapted to be submerged at their outlets in the subdivided portions, and means for connecting a source of steam supply under pressure to said nozzles when so submerged.

12. An apparatus for heat treating food comprising the combination of an enclosure, means for moving material progressively along the interior of the enclosure in portions segregated as described to prevent transfer of bacterial infection, said means including a ported rotary member for delivering transversely sweeping jets of steam into each segregated portion of material below the upper level thereof.

13. Apparatus for heat treating foods comprising the combination of a chamber through which such materials may be passed, traveling partition means for subdividing such material into segregated measured portions to be moved in accordance with the travel of the partition means, and means for substantially independently sterilizing each of the subdivided portions during its passage through the chamber.

14. Apparatus for heat treating foods including the combination with a trough-like enclosure, a conveyor therein provided with a helical flight fitting the lower portion of the wall of the enclosure and having a hollow shaft provided with steam jet nozzles between successive turns of the conveyor, means for maintaining a supply of food in the enclosure at a level with its surface in contact with the hollow shaft, said shaft being provided with nozzles projecting into the material and means for delivering steam into the material through the submerged jet nozzles.

15. Apparatus for heat treating foods, a conveyor for advancing measured portions of a continuous stream of material, an enclosure for said conveyor co-operative therewith for segregation of the measured material and means for delivering jets of steam into each segregated portion of material underneath the surface thereof while such material is being advanced by the conveyor, whereby to effect a constant shifting of the material with reference to the steam jet.

16. In apparatus for heat treating foods, the combination with a cylindrical enclosure, of a conveyor having a helical flight fitted to the wall of the enclosure and a hollow drum provided with steam jet nozzles, means for maintaining the food supply at a level between the upper and lower surfaces of the drum whereby to segregate the material and the atmosphere above it in one turn of the helix from the material and atmosphere above it in any turn separated from the first-named turn by one or more turns of the helix and means for injecting steam into the segregated portions of material through the nozzles submerged therein, said means being adapted to cut off the supply of steam to the un-submerged nozzles.

17. In apparatus for heat treating liquiform foods, the combination with a cylindrical conveyor chamber, of a helical conveyor for advancing the food in separated and substantially equal quantitative portions, means for segregating each portion from the other portions and means for injecting steam into the segregated portions, said conveying means being adapted to cause a relatively transverse travel of the jet with reference to the material.

18. Apparatus for sterilizing a moving stream of food material, comprising the combination of partitioning devices adapted to temporarily subdivide and segregate portions of the stream and means for injecting high velocity steam jets into such portions while moving along the general line of travel of the stream.

19. In apparatus of the class described, in combination, a container, a conveyor in said container, said conveyer including a shaft having passages therein arranged in a circular series about the axis of the shaft, a steam chamber at one end of the shaft, having a port in position for successive registry with said passages as the shaft is rotated, nozzles adapted to deliver high velocity steam jets from each passage at intervals along the length of the shaft, and said steam jets always being directed into the material being treated beneath the liquid level thereof.

20. In apparatus for treating liquiform material, in combination, a container having a receiving portion and a delivery portion, means for feeding liquiform material to be treated to said container, means associated with said container for subdividing the material being treated into separated portions, and at the same time continuously moving each portion from the receiving end of said container to the delivery end thereof, and means for injecting high velocity steam jets into each portion.

21. In apparatus of the class described, in combination, a container for holding liquiform material to be treated, means for delivering a continuous stream of liquiform material to said container, and means for conducting a continuous stream of material from said container, traveling partition means for subdividing the material moving through said container into separated portions and for continuously moving each portion from the receiving end of said container to the delivery end thereof, and means for introducing steam jets having a velocity of approximately 1400 feet per second into each portion beneath the surface of the material.

GEORGE GRINDROD.